US010124888B2

(12) United States Patent
Pounds

(10) Patent No.: US 10,124,888 B2
(45) Date of Patent: Nov. 13, 2018

(54) ROTORCRAFT

(71) Applicant: THE UNIVERSITY OF QUEENSLAND, St Lucia, Queensland (AU)

(72) Inventor: Paul Edward Ian Pounds, St Lucia (AU)

(73) Assignee: THE UNIVERSITY OF QUEENSLAND, Queensland (AU)

( * ) Notice: Subject to any disclaimer, the term of this patent is extended or adjusted under 35 U.S.C. 154(b) by 42 days.

(21) Appl. No.: 15/033,788

(22) PCT Filed: Oct. 31, 2014

(86) PCT No.: PCT/AU2014/050327
§ 371 (c)(1),
(2) Date: May 2, 2016

(87) PCT Pub. No.: WO2015/061857
PCT Pub. Date: May 7, 2015

(65) Prior Publication Data
US 2016/0280369 A1 Sep. 29, 2016

(30) Foreign Application Priority Data

Nov. 1, 2013 (AU) .............................. 2013904241

(51) Int. Cl.
B64C 27/00 (2006.01)
B64C 27/82 (2006.01)
(Continued)

(52) U.S. Cl.
CPC ............. B64C 27/82 (2013.01); A63H 27/00 (2013.01); B64C 27/08 (2013.01); B64C 27/43 (2013.01);
(Continued)

(58) Field of Classification Search
CPC ......... B64C 27/08; B64C 27/20; B64C 27/82; B64C 29/0016; B64C 29/0083; B64C 2201/024; B64C 2201/027; B64C 2201/042; B64C 2201/088; B64C 2201/108
See application file for complete search history.

(56) References Cited

U.S. PATENT DOCUMENTS

2006/0226281 A1* 10/2006 Walton .................... B64C 27/20
244/17.23
2010/0301168 A1* 12/2010 Raposo ................. A63H 23/00
244/171.2
(Continued)

FOREIGN PATENT DOCUMENTS

DE 10 2005 003028 7/2006
DE 10 2005 046155 4/2007
KR 10-1217803 * 1/2013 ............. B64C 27/20

OTHER PUBLICATIONS

International Search Report for PCT/AU2014/050327, dated Nov. 26, 2014, 6 pages.
(Continued)

Primary Examiner — Richard G Davis
(74) Attorney, Agent, or Firm — Nixon & Vanderhye P.C.

(57) ABSTRACT

A rotorcraft having a body and a propulsion system wherein the propulsion system includes a main thrust rotor and multiple control rotors, wherein the main thrust rotor is coupled to the body, whereby the main thrust rotor is driven by a main thrust drive shaft having an axis of rotation maintained in a fixed orientation to the body of the rotorcraft and wherein the multiple control rotors are arranged to control roll, pitch and yaw of the rotorcraft and are driven by respective control drive shafts offset to the axis of rotation of the main thrust drive shaft.

41 Claims, 9 Drawing Sheets

(51) Int. Cl.
*A63H 27/00* (2006.01)
*B64C 27/08* (2006.01)
*B64C 27/43* (2006.01)
*B64C 39/02* (2006.01)
*G05D 1/08* (2006.01)

(52) U.S. Cl.
CPC ......... *B64C 39/024* (2013.01); *G05D 1/0816* (2013.01); *B64C 2201/024* (2013.01); *B64C 2201/027* (2013.01); *B64C 2201/042* (2013.01); *B64C 2201/108* (2013.01)

(56) References Cited

U.S. PATENT DOCUMENTS

| | | | |
|---|---|---|---|
| 2011/0163199 A1* | 7/2011 | Cardozo | B64C 27/20 244/17.13 |
| 2013/0062454 A1* | 3/2013 | Alvarado Valverde | B64C 39/064 244/12.2 |
| 2013/0068877 A1* | 3/2013 | Choi | A63H 27/12 244/17.19 |
| 2013/0205941 A1 | 8/2013 | Tanose | |
| 2013/0206915 A1* | 8/2013 | Desaulniers | B64C 39/024 244/165 |
| 2013/0206919 A1* | 8/2013 | Shachor | B64C 39/022 244/23 A |

OTHER PUBLICATIONS

Written Opinion of the ISA for PCT/AU2014/050327, dated Nov. 26, 2014, 8 pages.

* cited by examiner

ROTORCRAFT

This application is the U.S. national phase of International Application No. PCT/AU2014/050327 filed 31 Oct. 2014, which designated the U.S. and claims priority to AU Patent Application No. 2013904241 filed 1 Nov. 2013, the entire contents of each of which are hereby incorporated by reference.

TECHNICAL FIELD

The present invention generally relates to rotorcraft and in particular to an unmanned aerial vehicle which combines features of a standard helicopter and a standard quadrotor.

BACKGROUND

Unmanned Aerial Vehicles (UAVs) have stepped out of the realm of academic research and military operations and are rapidly becoming useful in civilian applications. Advances in integrated avionics have driven the cost and complexity of UAVs down, and into the hands of commercial users. There is increasing demand for reliable UAV platforms that can carry large equipment payloads, and have longer flight times and range—particularly for indoor applications.

The utility of hovering UAV systems is bounded by available power sources, and the efficiency of transferring that energy to the air via rotors. This restricts the achievable payload, flight time and speed performance, typically to payloads of less than 1 kg or flight times of less than 20 minutes for vehicles small enough to fly through doorways and around human spaces. Increasing available energy stores correspondingly requires heavier (and thus larger) rotorcraft that would not fit in small spaces. The energy density of power sources improves slowly—thus, the current focus is on improving energetic performance of rotorcraft by maximising the power efficiency of lifting systems.

The power a rotorcraft requires to hover scales with the mass being lifted and the area of the rotor. For this reason, skycranes and cargo helicopters have particularly large diameter rotors or multiple rotors to reduce disc-loading. In contrast, the smaller rotors employed by quadrotors and multirotors are more energy intensive. However a trade-off of helicopters lies in the complex rotorhead mechanics, which are maintenance intensive—quadrotors, conversely, are simple and robust.

The small rotor sizes of quadrotors and multirotors makes them intrinsically less energy efficient than a traditional helicopter with a large single rotor. However, the quadrotor configuration's innate simplicity and inexpensive construction recommends its use in many aerial robotics applications.

Some prior art designs are aimed at increasing lift by employing rotors matched to a chemical fuel drive system; they rely on the drag torque of co-linear outboard rotors to provide counter-torque. Their use of numerous outboard rotors (four or more), which require a larger footprint for a given main rotor diameter, reduces the expected achievable efficiency compared with the proposed configuration.

There are two broad areas of interest in the performance of quadrotors: energetic performance and control performance. Energetics determines the achievable flight time, range and payload weight a rotorcraft can carry, while control determines its ability to manoeuvre and reject disturbances.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

BRIEF SUMMARY

The present invention seeks to provide a rotorcraft that combines advantageous features of a helicopter and a quadrotor.

According to one example aspect, there is provided a rotorcraft having a body and a propulsion system wherein the propulsion system includes a main thrust rotor and multiple control rotors, wherein the main thrust rotor is coupled to the body, whereby the main thrust rotor is driven by a main thrust drive shaft having an axis of rotation maintained in a fixed orientation to the body of the rotorcraft and wherein the multiple control rotors are arranged to control roll, pitch and yaw of the rotorcraft and are driven by respective control drive shafts offset to the axis of rotation of the main thrust drive shaft.

In one form, the main thrust rotor also has collective blade pitch control.

In another form, the rotorcraft further includes a flapping hinge associated with the main thrust rotor to assist with gyroscopic precession correction.

In another form the roll, pitch and yaw of the rotorcraft are controlled by varying one or more of blade pitch, speed or orientation of the control rotors.

In another form the size and/or design of the main thrust rotor is maximised to provide greater thrust generation efficiency.

In another form the sizes and/or design of the control rotors are minimised to provide faster response to variations in pitch, speed or orientation of the control rotors.

In another form the control rotors are in an array disposed about the axis of rotation of the main thrust drive shaft.

In another form the rotorcraft includes three control rotors.

In another form the control rotors are arranged about the axis of rotation of the main thrust drive shaft at intervals of 120°.

In another form the control rotors are arranged asymmetrically about the axis of rotation of the main thrust drive shaft.

In another form the control rotors are radially disposed from the axis of rotation of the main thrust drive shaft and are positioned above or below and within the swept area of the main thrust rotor.

In another form the control rotors are positioned in the downwash of the main thrust rotor.

In another form the control drive shafts are canted relative to the axis of rotation of the main thrust drive shaft.

In another form the orientations of the control drive shafts are fixed.

In another form the control rotors have fixed pitch blades.

In another form the thrust of the main thrust rotor is parallel to the axis of rotation of the main thrust drive shaft.

In another form a mechanical or flexural flapping hinge is included in the main thrust rotor whereby the main thrust rotor rotates in a plane that may tilt with respect to the body of the rotorcraft.

In another form the rotorcraft has a centre of mass, wherein the main thrust rotor is positioned below the centre of mass of the rotorcraft.

In another form a controller is used to correct for rotor gyroscopic precession torques using the control rotors.

In another form the controller uses modified linear PID control with gyroscopic correction to correct for rotor gyroscopic precession torques.

In another form a feedback control system is used to stabilise the rotorcraft in flight.

According to another example aspect, there is provided a method of controlling the rotorcraft, including manoeuvring the rotorcraft by varying one or more of the pitch, speed or orientation of one or more of the control rotors and/or a collective blade pitch of the main thrust rotor.

According to one example aspect, there is provided a rotorcraft with a fixed-pitch main rotor that generates lift and torque and multiple control rotors to provide counter-torque and attitude control.

In another form, the control rotors are canted relative to the main rotor.

According to another example aspect, the control rotors are arranged to generate a component of vertical thrust to produce a manoeuvring moment for the rotorcraft.

In another particular, but non-limiting, example form, the rotorcraft further includes a drive system that allows independent speed control of each of the control rotors and/or the main rotor to allow for manoeuvring.

In another example form, the control rotors are arranged to spin in the same direction.

In accordance with another optional embodiment, provided by way of example only, the control rotors are smaller than the main rotor and have fixed pitch blades.

In another example form, three control rotors are arrayed about the rotorcraft.

In another form, the control rotors are arranged about the centre of the rotorcraft at intervals of 120°.

In another form, the control rotors are arranged asymmetrically about the centre of the rotorcraft.

According to yet another optional aspect, the control rotors are mounted on booms that project from a main body of the rotorcraft.

In another form, the main rotor defines a rotor disc area footprint that covers the control rotors.

According to another aspect, the control rotors are positioned downstream of the main rotor.

According to yet another example aspect, the rotorcraft is in the form of an unmanned aerial vehicle.

According to another example aspect, there is provided a rotorcraft including a main rotor that rotates on a primary plane and a plurality of control rotors, wherein each control rotor rotates on a separate control plane that is at an angle relative to the primary plane.

In another particular, but non-limiting, example form, the angles of the control planes relative to the primary plane are fixed.

In another form, the main rotor and control rotors have fixed pitch blades.

According to yet another example aspect, the control rotors rotate in the same direction.

In another form, a controller is used to correct for rotor gyroscopic precession torques using the control rotors.

In another form, the controller uses modified linear PID control with gyroscopic correction to correct for rotor gyroscopic precession torques.

In another form, a mechanical or flexural flapping hinge is included in a rotor head such that the primary plane may tilt with respect to a main body of the rotorcraft.

In another form, a feedback control system is used to stabilise the rotorcraft in flight.

In another form, the main rotor is located below the main body of the rotorcraft.

In another form, a centre of mass of the rotorcraft is located between the primary plane and the control planes.

According to another example aspect, there is provided a method of controlling a rotorcraft, including manoeuvring the rotorcraft by adjusting the relative speed of one or more of the control rotors.

In another form, the adjustment of the relative speed of one or more of the control rotors causes the rotorcraft to pitch, roll or yaw.

BRIEF DESCRIPTION OF FIGURES

Example embodiments should become apparent from the following description, which is given by way of example only, of at least one preferred but non-limiting embodiment, described in connection with the accompanying figures.

PREFERRED EMBODIMENTS

Figure 1:
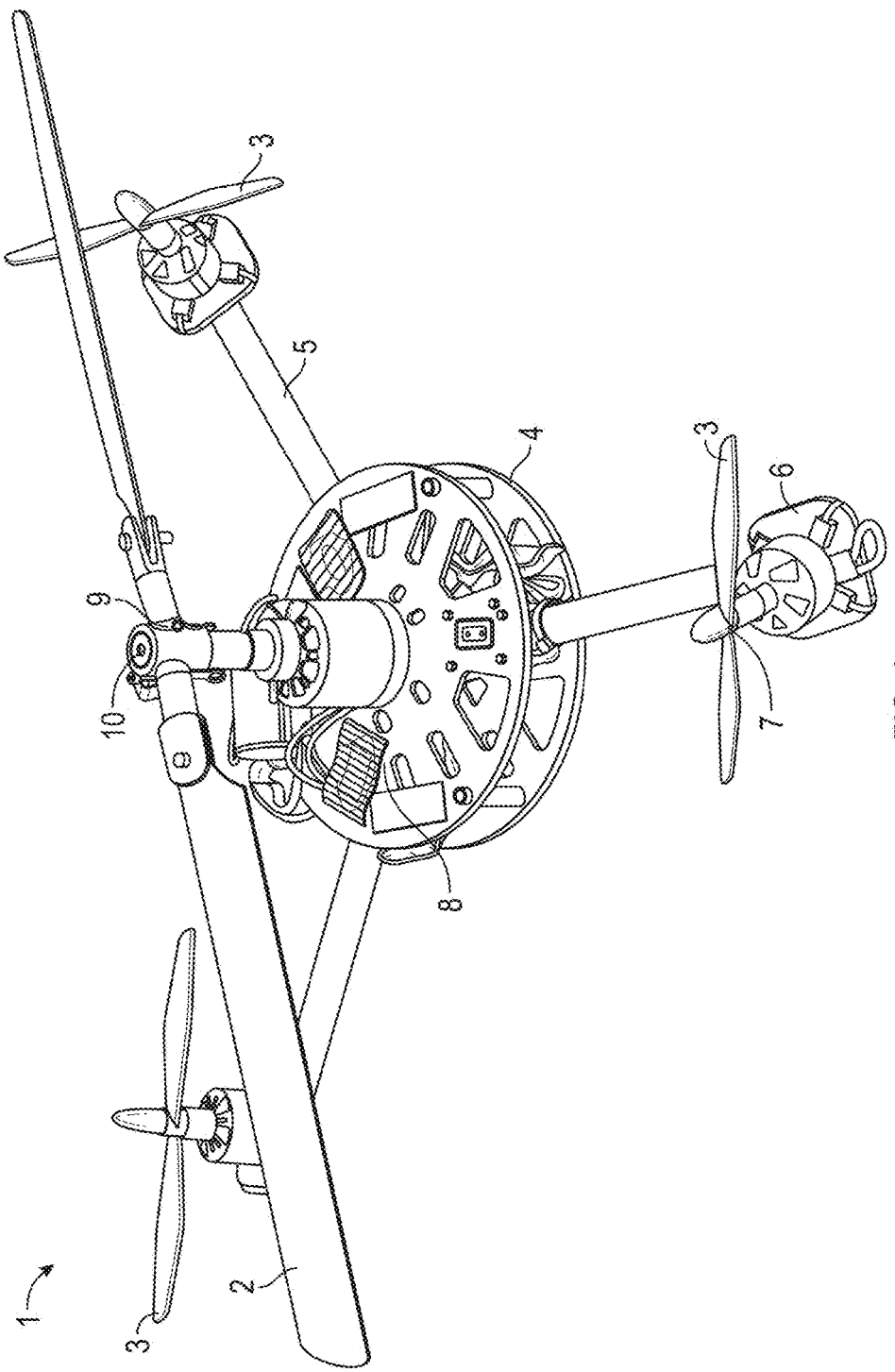
FIG. 1 illustrates a preferred embodiment of the present invention.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Referring to FIG. 1, a preferred embodiment of a rotorcraft 1 is shown that includes a main rotor 2 and three control rotors 3. The control rotors 3 are connected to the main body 4 of the rotorcraft 1 by booms 5. The main body 4 may house components necessary for successful operation such as batteries, controllers and sensors. The control rotors 3 are connected to the booms 5 by a motor 6 and a drive shaft 7. In the preferred embodiment the blades of the control rotors 3 are fixed to the drive shaft 7, however in other embodiments these may be movable. Similarly, the main rotor 2 is connected to the main body 4 by a motor 8, drive shaft 9 and rotor head 10. Again, the blades are fixed, however in alternative embodiments may be movable. In a preferred embodiment the motors 6, 8 are brushless DC motors, however may be any other suitable motor.

Figure 2:
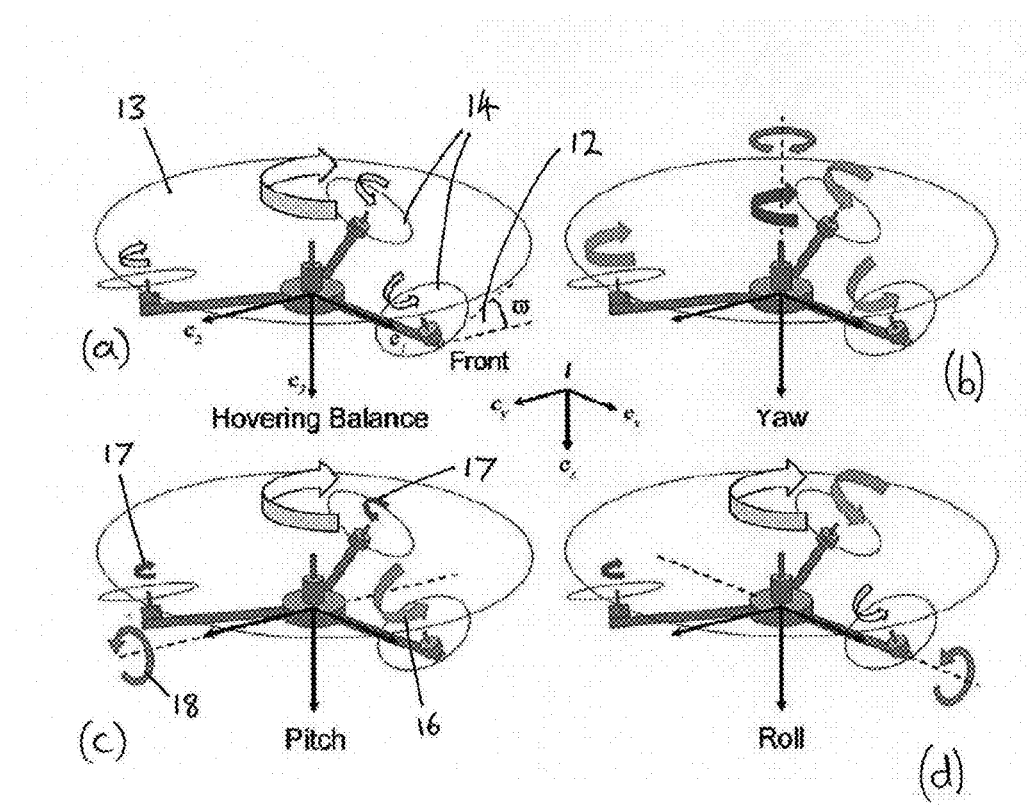
FIG. 2 illustrates control mechanisms for a preferred embodiment where arrow sizes indicate relative rotor velocities.

Referring now to FIG. 2, the control rotors 3 are canted relative to the main rotor 2. This angle 12 between the primary plane 13 and the control plane 14 is fixed in the preferred embodiment, however may be adjustable or even moved during use in alternative embodiments. By angling the control rotors 3 to the side in this way, they provide both a vertical thrust component for use in manoeuvring the rotorcraft 1 and a horizontal thrust component for counter-torque to offset the drag torque produced by the main rotor 2. In an alternative embodiment, however, the control rotors 3 may not be canted, but instead rely only on counter torque to offset the torque of the main rotor 2.

The preferred embodiment of the rotorcraft 1 merges the simplicity of a quadrotor with the energy efficiency of a helicopter, while improving manoeuvring rotor bandwidth. The configuration presented may be referred to as a 'Y4' or 'triangular quadrotor'. Theoretical analysis indicates that the present invention may provide a 20 percent reduction in hovering power required when compared with a similarly sized conventional quadrotor. Using a matched pair of quadrotor/triangular quadrotor rotorcraft, preliminary experiments show that the test-bed Y4 used 15 percent less power, without optimisation.

While the preferred embodiment employs a single large main rotor 2 with three smaller control rotors 3, any number of control rotors 3 may be used. The control rotors 3 are canted to provide counter-torque like the tail rotor of a traditional helicopter. By placing the control rotors 3 beneath or above the main rotor 2, the largest rotor disc area may be realised for a given maximum footprint diameter. Furthermore, the low rotational inertias of the smaller control rotors 3 increase the available attitude control bandwidth, but at the cost of increased gyroscopics of the larger main rotor 2.

The preferred embodiment is a hybrid between traditional helicopters and quadrotors. The large fixed-pitch main rotor 2 at the centre of the rotorcraft 1 provides the majority of lift. The smaller control rotors 3 provide lateral thrust. Like the traditional helicopter, the boom-mounted control rotors 3 provide active counter-torque; like a quadrotor, the control rotors 3 provide control torques. Unlike a quadrotor, the control rotors 3 are not intended to provide significant lifting thrust.

The manoeuvring moment produced by the control rotors 3 is derived from their vertical thrust component. Control torques are applied much like standard quadrotors—the speed of one control rotor 3 is increased while the other two is decreased. This maintains the total counter-torque produced in the plane, whilst producing an asymmetry in the vertical thrust components. This is illustrated in FIG. 2(c), where the large arrow 16 indicates increased speed and the small arrows 17 indicate reduced speed, resulting in change in pitch 18 of the rotorcraft 1, similar to a standard quadrotor. Yaw control is derived akin to traditional helicopters—the combined counter-torque of the boom-mounted rotors is increased or decreased to affect azimuthal rotation, as illustrated in FIG. 2(b).

The Y4 configuration, where three control rotors 3 are evenly arranged about the rotorcraft 1 (i.e. there is a 120° interval between each control rotor) provides an optimal balance between maximising control authority while minimising weight and redundant control rotors 3. It may be advantageous in certain situations, however, to create embodiments with different numbers or locations for the control rotors 3. For example, an asymmetric configuration that provides increased pitch control and reduced roll control may be considered beneficial, allowing the rotorcraft 1 to fly in a manner more closely aligned with a fixed wing aircraft than a helicopter.

As a rotorcraft with four fixed-pitch rotors, the Y4 configuration technically remains a quadrotor and preserves its mechanical simplicity, while also delivering the full area of lifting surface provided by a helicopter. The control rotors 3 can be mounted outboard of the main rotor 2 or above or below it. Outboard control rotors provide more effective torque for lower thrust (but with longer boom arms 5), while under or over mounted control rotors allow the design to be made maximally compact. Furthermore, in the preferred embodiment the control rotors 3 all spin the same direction, reducing the limitation of requiring matched forward and contra-rotating pairs and increasing flexibility when designing with commercial off-the-shelf parts.

Figure 3:
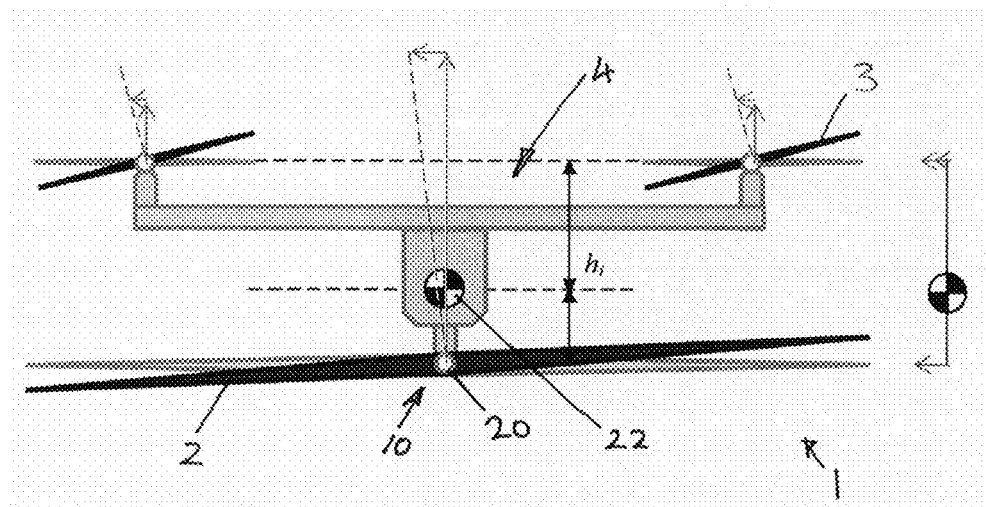
FIG. 3 illustrates the effect of torques produced by rotor flapping on an embodiment with the control rotors positioned above the main rotor.
Figure 4:
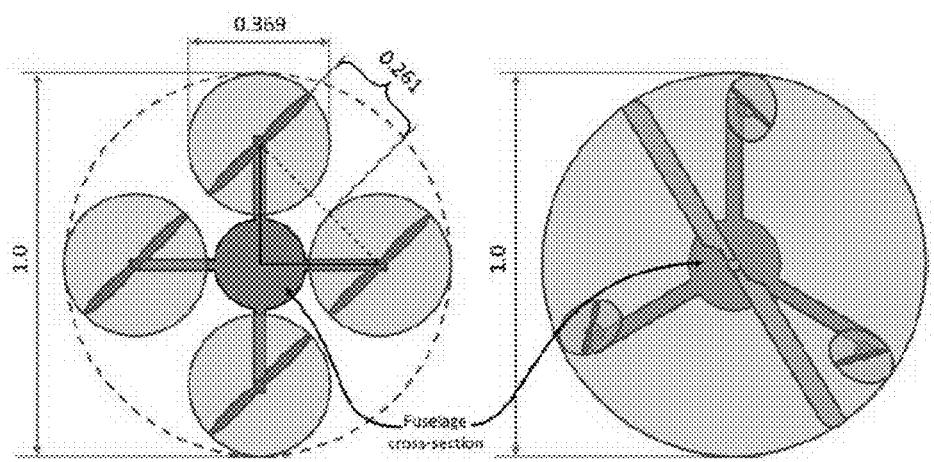
FIG. 4 illustrates a lifting area comparison between a conventional quadrotor and the present invention.
Figure 5:
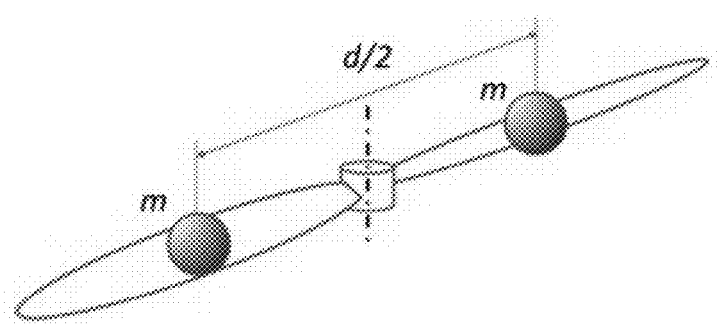
FIG. 5 illustrates a two point mass rotor inertia model.

Flapping is a well-known mechanism in helicopters by which the blades of a helicopter rotor translating horizontally through the air experience differing airflow velocities, depending on whether the blade is advancing into the on-coming air, or retreating from it. The advancing blade produces more lift, while the retreating blade produces less—this change in loading causes the blades to rise and fall ("flap") as they spin around the rotor axis. The flapping motion of the rotor is synchronous with the rotor rotation rate; the net result is that rotor tip path plane distorts, tilting away from the direction of travel and causing the rotor to direct some of its thrust backwards. If unconstrained, the flapping motion would fracture the rotorhead. All helicopters incorporate mechanical flapping hinges, or else undergo blade flexural flapping through elastic deformation of the blades. FIG. 3 illustrates an embodiment with flapping hinges 20 located at the rotor heads 10.

As the rotor is typically situated some distance away from the helicopter centre of mass, the lateral thrust component due to rotor flapping induces a torque. This torque couples with lateral dynamics of the aircraft to create an unstable oscillation. By constructing the aircraft such that the rotor is below the centre of mass, the direction of the induced torque is inverted—the helicopter instead exhibits a non-oscillatory instability ("side slip") that is more easily corrected. Putting the rotor level with the centre of mass produces no net torque, and renders the coupled attitude-translation system dynamically neutral—this is the optimal configuration for flight stability.

FIG. 3 illustrates an embodiment with placement of the main rotor 2 below the main body 4 of the rotorcraft 1. The centre of mass 22 is shown at a location between the main rotor 2 and the control rotors 3.

By situating multiple rotors above and below the centre of mass 22 of the rotorcraft 1, these effects of rotor flapping can be used to cancel each other out, such that the torques induced by the upper rotors counteract the torque induced by the lower rotor. The total rotor array configuration must satisfy:

$$\Sigma h_i T_i q_{1i} = 0$$

where $h_i$ is the height of the ith rotor above the centre of mass, $T_i$ is the thrust of the ith rotor, and $q_{1i}$ is the geometric rotor translation flapping coefficient of the ith rotor.

This situation is illustrated in FIG. 3. The control rotors 3 are located above the centre of mass, while the main rotor 2 is located below the centre of mass. Careful positioning allows the resulting torques induced by flapping to sum to zero.

In one embodiment a mechanical or flexural flapping hinge 20 may be included in the rotor head 10 so that the tip path plane, or primary plane 13, of the rotor 2 may tilt with respect to the main body 4 of the rotorcraft 1. The rotorcraft 1 may also use the flapping hinge 20 and incorporate a feedback control system to stabilise the rotorcraft 1 in flight. The feedback control system could be used to stabilise the rotorcraft 1 in flight, where the controller is a Proportional-Integral-Derivative system, Linear Quadratic, or Lyapunov control system.

Flapping hinges 20 are used to decouple the dynamics of the main rotor 2 from the motion of the aircraft body 4. This has the effect of eliminating gyroscopic torques from the motion mechanics, in exchange for slower coupled pitch-translation dynamics that are easily controlled with classic regulator schemes.

Rotor Energetics and Inertia

There are two broad areas of interest in the performance of quadrotors: energetic performance and control performance. Energetics determines the achievable flight time, range and payload weight an aircraft can carry, while control determines its ability to manoeuver and reject disturbances. This paper predominantly considers the energetics of the triangular quadrotor configuration, but a control model is also presented with references to conventional quadrotor design.

A. Quadrotors vs Traditional Helicopter

From momentum theory, the induced power in the air required by a rotor, $P_A$, is linked to the desired thrust:

$$P = \frac{T^{3/2}}{\sqrt{2\rho A}} \quad (1)$$

where T is the hover thrust $\rho$ is the density of air, and A is the rotor disc area. For a traditional helicopter, T is weight force of the aircraft and the effective area of the rotor will be the region swept by the rotor disc, less the region obscured by the fuselage and tail boom. A traditional helicopter also pays a 5 to 30 percent power overhead for its tail rotor to provide counter-torque that offsets the drag torque of the main rotor.

In contrast, for a quadrotor, the thrust force on each rotor is one quarter of the whole. For a given footprint diameter, the area of the rotors is that of four discs inscribed in the bounding circle. However, interactions of the blade vortices generated by rotors require greater spacing between them; a rule of thumb is $\sqrt{2}$ times rotor radius. Consequently, there is substantially less lifting area available to a conventional quadrotor than a helicopter, although it should be noted not all rotorcraft follow this rule; some tandem helicopters space their rotors closer, or even overlapping, at the expense of higher power requirements.

Consider a traditional helicopter and a quadrotor, with equal mass, each designed to fit within a unit diameter circular footprint. Assume both have equal fuselage cross-section, such that the entirety of the fuselage exists outside of the quadrotor rotor discs—which are spaced to avoid vortex interaction (see FIG. 3)—but which negates an equal area under the helicopter rotor. The effective rotor disc area available to the helicopter will be 0.732 units$^2$; the total rotor disc area available to the quadrotor will be 0.428 units$^2$.

Consequently, from (1), the total lifting power required by the quadrotor will be 1.31 times that of the traditional helicopter—almost a third more. Adding 5 percent parasitic power overhead required for a traditional tailrotor, the power saved is approximately 25 percent. Thus, a quadrotor may be expected to fly only 80 percent as far or as long as a traditional helicopter UAV.

B. Y4 Configuration

In a simple analysis, the energetics of the main rotor is identical to that of a helicopter, albeit with the option of including the smaller rotors in the inflow or outflow. In comparison with a traditional helicopter, the three smaller motors provide only one-third the counter-torque thrust of an equivalent tail boom. Obviously, as cant angle $\bar{\omega}$ is increased to 90 degrees, the thrust (and thus power) required diminishes to a minimum—but this comes at the cost of greatly increasing the power required to affect manoeuvering thrust changes. Cant angle must be chosen to balance control bandwidth and hover power.

From (1), the simple case of three counter-torque tail rotors with 45 degree cant would require 97 percent of the power of an equivalent single tail rotor of the same size. Each generates $\sqrt{2}/3$ times as much thrust as the single tail rotor, but together produce an equivalent counter-torque. However, the drag torques produced by the boom rotors can themselves be used to provide counter-torque (much like a quadrotor), allowing lower cant angles and further reducing the power required. In this way, the efficiency of a Y4 may be comparable to that of a conventional helicopter.

Given reduced main rotor power and boom rotor requirements, in total, it is expected that a correctly tuned triangular quadrotor may require 20 percent less power than a conventional quadrotor for the same diameter footprint.

C. Rotor Inertial Effects

An additional feature of the Y4 arrangement is the lower rotational inertia of its manoeuvering rotors, at the expense of slower rise time and more gyroscopics of the main rotor.

The dynamics benefit derived from even small reductions in rotor size are significant. Consider a simple two-point mass rotational inertia model:

$$I_{zz} = m_R \frac{d^2}{4} \quad (2)$$

where I is the axial rotational inertia, $m_R$ is the rotor mass, and d is the rotor diameter. With mass scaling with the cube of linear dimension, halving the diameter of the rotor would reduce its mass by a factor of eight (assuming no other geometry changes). These scalings taken together mean a rotor half the size of that of a conventional quadrotor would have only 3 percent of the rotational inertia. Consequently, this configuration promises to provide substantially higher pitch and roll control bandwidth than achievable with a standard quadrotor. This is particularly important when considering larger quadrotors, where changing rotor speed rapidly is essential to stability of the aircraft.

The trade-off is that increasing the main rotor size correspondingly increases the influence of the gyroscopic effect. Unlike a quadrotor, triangular quadrotors have an asymmetry in rotational velocities; the total rotational inertia does not sum to zero and the gyroscopic moments of rotors do not balance. The gyroscopic force applied by a rotor is related to the pitch/roll velocity of the rotor and the rotor's angular momentum:

$$\tau = \omega \times I_R \omega \qquad (3)$$

where $I_R$ is the inertia matrix of the rotor, $\omega$ is the rotor angular velocity vector and $\tau$ is the resultant torque vector. A Y4 may have a main rotor 2.7 times the diameter of a single quadrotor rotor—resulting in 146 times the rotational inertia, and thus 146 times the developed gyroscopic moment. Without the torque cancellation from a contra-rotating opposite pair, gyroscopic forces are a substantial influence that must be accounted for in the flight control. In general, the angular momentum of the rotor about its driven axis is several orders of magnitude above its roll or pitch momentums. Thus, the simplification can be made:

$$\tau = I_{zz} \omega_z \Omega_x \qquad (4)$$

where $\omega_z$ is the angular velocity of the rotor about its driven axis, respectively, and x is the skew-symmetric matrix cross-product operator.

D. Rotor Performance Considerations

The triangular quadrotor configuration both removes and adds aerodynamic complexities to the standard quadrotor design. A consideration in the design of quadrotors is the interaction of vortices of closely-spaced rotors. These vortices arise from the recirculation of high pressure air beneath the rotor that mixes with the low pressure air above. This creates a trailing spiral of entrained air that dissipates energy from the flow, called 'tip loss'. The interaction of vortices from closely spaced rotors can induce vibration and makes analytical computation of aircraft performance difficult.

By limiting lift production to a single rotor, the effect of these vortex interactions can be greatly reduced. The main rotor is the strongest vortex generator; if placed upstream of the smaller rotors, it will not experience interference from the shed wake of smaller rotors. Likewise, the relatively high disc-loadings and outflow velocities of smaller manoeuvering rotors reduce the influence of a non-uniform shed vortex sheet in the outflow of a large rotor. Placing these smaller rotors around the vena contracta of the main rotor would further insulate them, but this requires vertical spacing. A typical rotor vena contracta occurs less than d/4 m downstream of the rotor plane.

While increasing rotor area decreases the absolute amount of power required, centralising rotor lift and actuator effort can make employing that power more efficient. Changing rotor size alters the blade tip velocity, and thus airfoil Reynolds Number. Changing Reynolds Number effects the lift-drag ratio of the airfoil, which determines the rotor's aerodynamic efficiency (the Figure of Merit) at converting mechanical shaft power into aerodynamic power induced in the air. Reynolds Number for an airfoil section is a function of tip-speed, chord length and aerodynamic parameters:

$$RE = \frac{\rho v_{tip} c}{v} \qquad (5)$$

where $v_{tip}$ is the fluid velocity (tip speed), c is the chord length and $\upsilon$ is the dynamic viscosity of air.

Rotor design requires a careful balance between rotor radius, tip speed and tip chord to tune the Reynolds Number for a particular airfoil profile. Flow parameters set the airfoil lift and drag coefficient values, $C_l$ and $C_d$, that relate the forced developed by a wing for a given airspeed, through complex non-linear aeromechanics. The airfoil coefficients in turn specify a rotor's non-dimensionalised thrust and drag coefficients $C_T$ and $C_Q$:

$$C_T = \frac{C_l \sigma}{6} \qquad (6)$$

$$C_Q = \frac{1}{2} C_T^{3/2} + \frac{C_d \sigma}{8} \qquad (7)$$

where $\sigma$ is the disc solidity. Rotor coefficients relate the thrust, torque and shaft power developed by a rotor to its angular velocity:

$$T = \frac{1}{4} C_T \rho A (d\omega)^2 \qquad (8)$$

$$Q = \frac{1}{8} C_Q \rho A d^3 \omega |\omega| \qquad (9)$$

$$P_M = \frac{1}{8} C_Q \rho A (d\omega)^3 \qquad (10)$$

where T, Q and $P_M$ are the thrust, drag torque and shaft power of the rotor, respectively, $\rho$ is the density of air (taken as 1.184 kg/m³), A is the planform area of the rotor disc, and $\omega$ is the axial rotational velocity of the rotor.

The rotor coefficients can be used to directly compute the Figure of Merit:

$$\eta_A = \frac{C_T^{3/2}}{C_Q \sqrt{2}} \qquad (11)$$

Rotors of equal airfoil coefficients and solidity will have equal rotor efficiency, despite differing flow conditions.

For non-turbulent low free-stream Mach numbers, increasing Reynolds Number correlates with increasing airfoil lift. Thus, the higher tip speeds of a large rotor provide more scope for efficient rotors; the smaller rotors of micro helicopters are known to be of substantially lower performance than those of manned aircraft.

Dynamic Modeling and Control

With two key exceptions, the flight control and stabilisation of a Y4 quadrotor is identical to that of a standard quadrotor. Both types of aircraft can be considered as rigid body systems with rotors acting as force-torque generators. We first present a model for a standard quadrotor, and then describe how that of the triangular quadrotor differs.

A. A Standard Quadrotor Model

A common quadrotor dynamic model expressed in the body-fixed frame is:

$$\dot{\xi} = Rv \qquad (12)$$

$$m\dot{v} = m\Omega_x v + mgR' e_3 + T e_3 \qquad (13)$$

$$\dot{R} = R\Omega_x \qquad (14)$$

$$I\dot{\Omega} = -\Omega_x I\Omega + \Gamma \qquad (15)$$

where $\xi$ is the vehicle position, R is the attitude rotation matrix, v is the body velocity, $\Omega$ is the rigid body rotational velocity vector, m and I are the mass and rotational inertia matrix of the flyer, g is acceleration due to gravity and T and $\Gamma$ are the total rotor thrust and torque vectors.

In equation 10, ω is multiplied by its magnitude to preserve the sign of rotation for counter-rotating rotors.

For both 9 and 10, only the rotor velocity is non-constant they can be simplified to $T_i = \alpha \omega_i^2$ and $Q_i = k \omega_i^2$. Thus, the force-torque mapping of a standard quadrotor can be summarised by a single matrix relating rotor speed to forces:

$$\begin{bmatrix} T \\ \Gamma_1 \\ \Gamma_2 \\ \Gamma_3 \end{bmatrix} = \begin{pmatrix} \alpha & \alpha & \alpha & \alpha \\ 0 & -r\alpha & 0 & r\alpha \\ r\alpha & 0 & -r\alpha & 0 \\ \kappa & -\kappa & \kappa & -\kappa \end{pmatrix} \begin{bmatrix} \omega_1^2 \\ \omega_2^2 \\ \omega_3^2 \\ \omega_4^2 \end{bmatrix} \quad (16)$$

where are rotors are indexed 1-4, clockwise, starting at the front, and r is the boom arm distance from the centre of gravity to each rotor centre.

B. Triangular Quadrotor Adaptation

With reference to the above model, the changes made for the triangular quadrotor are small. Firstly, the rigid body angular velocity dynamics must explicitly incorporate the unbalanced gyroscopic contribution $\tau_i$ of each of the rotors according to (4).

$$I\dot{\Omega} = -\Omega_x I \Omega + \Sigma \tau + \Gamma \quad (17)$$

The gyroscopic torques are almost entirely concentrated in the main rotor—we explicitly ignore the contribution of the smaller rotor gyroscopics. Also explicitly ignored are the small side forces produced by the boom rotors; T considers only vertical force contributions.

Secondly, the force-torque mappings of the rotors are quite different and are dependent on $\bar{\omega}$:

$$\begin{bmatrix} T \\ \Gamma_1 \\ \Gamma_2 \\ \Gamma_3 \end{bmatrix} = \begin{pmatrix} \alpha C_{\bar{\omega}} & \alpha C_{\bar{\omega}} & \alpha C_{\bar{\omega}} & \alpha_M \\ 0 & -\frac{\sqrt{3}}{2} r\alpha C_{\bar{\omega}} & \frac{\sqrt{3}}{2} r\alpha C_{\bar{\omega}} & 0 \\ r\alpha C_{\bar{\omega}} & -\frac{1}{2} r\alpha C_{\bar{\omega}} & -\frac{1}{2} r\alpha C_{\bar{\omega}} & 0 \\ r\alpha S_{\bar{\omega}} + \kappa C_{\bar{\omega}} & r\alpha S_{\bar{\omega}} + \kappa C_{\bar{\omega}} & r\alpha S_{\bar{\omega}} + \kappa C_{\bar{\omega}} & -\kappa_M \end{pmatrix} \begin{bmatrix} \omega_1^2 \\ \omega_2^2 \\ \omega_3^2 \\ \omega_M^2 \end{bmatrix} \quad (18)$$

where $\alpha$ and $\kappa$ and $\alpha_M$ and $\kappa_M$ are the boom rotor and main rotor proportional thrust and drag coefficients, respectively. The shorthands Sx and Cx stand for sin(x) and cos(x), respectively.

C. Controllability and Stabilisation

It is well-known that quadrotors perform well in hover under linear PID control. The control mapping matrices of quadrotors given in (16) is full rank and invertible, as is the case for triangular quadrotors in (18), given non-singular boom rotor cant angles (0<$\bar{\omega}$<π/2). This allows for full independent control of roll, pitch and yaw torques and thrust. The control structure of a Y4 could therefore be expected to be very similar to that of a standard quadrotor, barring the effect of the main rotor gyroscopics.

Conveniently, the variables on which the gyroscopic forces depend—rotor inertia, rotor velocity and roll-pitch rate—are constant physical parameters easily measured offline, or aircraft states sensed online by most flight controllers. This, combined with a well-understood gyroscopic model, recommends a feedback linearisation approach to stabilising triangular quadrotors.

A proposed simple control law takes the form of a modified linear PID control with gyroscopic correction:

$$\Gamma = \left(k_p + k_i \frac{1}{s} + k_d s\right) \begin{bmatrix} \phi \\ \theta \\ \psi \end{bmatrix} - \omega_M I_{M_{zz}} \begin{bmatrix} 0 & s & 0 \\ -s & 0 & 0 \\ 0 & 0 & 0 \end{bmatrix} \begin{bmatrix} \phi \\ \theta \\ \psi \end{bmatrix} \quad (19)$$

where φ, θ and ψ are the roll, pitch and yaw angles of the craft, and $k_p$, $k_i$ and $k_d$ are control gains identical to those of a standard quadrotor of the same size and weight.

An additional advantage of the triangular configuration is improved yaw performance. The value of κ for a standard quadrotor is typically very small, and the near cancellation of rotor drag forces in hover results in low yaw control authority. In contrast, the magnitude of $r\alpha S_{\bar{\omega}} + \kappa C_{\bar{\omega}}$ for the Y4 is much larger and the contributions of each boom rotor are cumulative; they may provide as similar degree of yaw control authority as a conventional helicopter.

Experiments

We have undertaken preliminary analysis of the predictions of the energetic and control performance of the triangular quadrotor configuration. The large number of variables involved in the design of a quadrotor of either configuration makes a direct comparison difficult. To explore the relative merits of the proposed design, two quadrotors were constructed to be as similar as possible, within the limits of their differing rotor configurations—a standard 'control' quadrotor and Y4 testbed. These were then tested in static tests to compare their thrust performance and energy consumption. The triangular quadrotor was also flown to ascertain the stability of simple PID flight control. Detailed comparative control response tests of the triangular quadrotor and standard quadrotor are ongoing, and not presented in this paper.

A. Comparative Test-Beds

To make as meaningful a comparison as possible between two dissimilar aircraft, both vehicles must be structured along common lines where possible. The aircraft are designed to be small sub-kilogram vehicles with 30 percent thrust margin and fit through a conventional doorway (5"0 cm diameter). The two test-bed aircraft were specifically designed to keep the following common parameters identical:
- 850 g gross mass
- 480 mm footprint diameter
- 300 g actuator mass
- Chassis hub and arm units
- Battery type and capacity
- Flight controller Aside from the motor and rotor size and placement being tested, the following design parameters were unavoidably different:
- Rotor geometry
- Motor manufacturers
- Electronic speed controller model Of these non-idealities, the greatest scope for miscomparison lies in the unavailability of performance-matched rotors in the various sizes needed. For the purpose of comparison, rotors with dissimilar airfoils can be tuned to give similar aerodynamic performance such the airfoils operate at Reynolds Numbers that induce similar $C_l$ and $C_d$ ratios with sufficient thrust—reducing pitch angle increases tip-speed and lift (and Reynolds Number) while reducing chord decreases Reynolds Number without effecting lift.

We elected to use a stock rotor tuned for the standard quadrotor configuration and chose an off-the-shelf variable-pitch conventional rotor for the Y4, adjusted to a fixed angle. The rotors used for the main Y4 and 'control' quadrotors are configured such that the rotor efficiency of each are approximately equal (within 3 percent), with the conventional quadrotor having a slight advantage. Furthermore, it was not possible to obtain a 250-series rotor with 480 mm rotor diameter; the closest match available was 460 mm. This gives the 'control' quadrotor another small relative advantage.

The standard quadrotor and Y4 test-beds use identical manufacturers for their manoeuvering thruster motors. These parts were chosen to provide suitable rotor power while maintaining the actuator mass-fraction of the vehicle. The same manufacturer was used to reduce potential variation introduced by different fabrication technology from different makers. However, this could not be maintained for the main rotor of the Y4, as no manufacturer could be found that produced both fast, small motors for flight control and also large motors with low flux-linkage coefficient. Thus, the main rotor motor is of a slightly different design. For similar reasons, it was not possible to use motor controllers from the same manufacturer for every motor. However, it is expected that variation in the performance of electronic speed controllers will be small. A mass-budget breakdown for the two aircraft is given in Table I.

B. Test-Bed Power Performance

Figure 6:
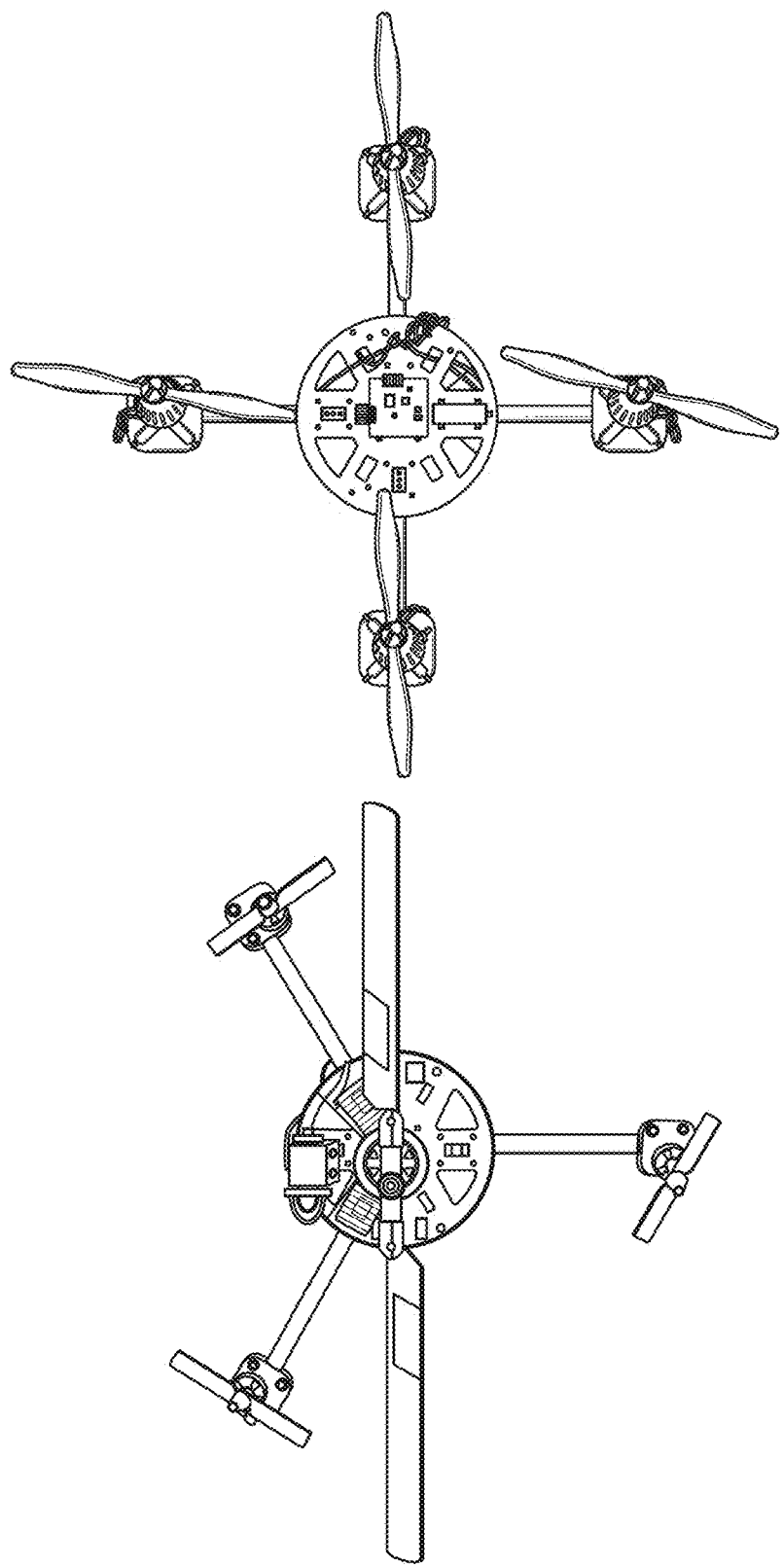
FIG. 6 illustrates a preferred embodiment of the present invention and a similar vehicle in standard quadrotor configuration.

The expected power requirements of the aircraft can be computed using (9-10). The non-dimensionalised coefficients for each rotor were determined empirically using a fixed thrust test rig (see FIG. 6), and are given in Table II—rotor velocity in hover conditions is denoted $\omega_0$ and induced aerodynamic hover power is $P_A$. A sample static thrust test comparing the low-end performance of the standard quadrotor rotors and the Y4 main rotor, both powered by 3-cell Lithium Polymer packs. Current was measured with an Attopilot meter and thrust was measured with a digital scale. These tests indicate that the Y4's lift rotor produces greater lift thrust per Amp, at the low end of the rotor performance range.

The hover power requirement for the Y4 boom motors is based on a 30 degree rotor cant; this was determined through trial and error to provide good manoeuvering authority but also effective low-power counter-torque. In hover, it is expected that the Y4 will use 45.4 W of lifting power, while the standard quadrotor test-bed will require 58.6 W of continuous induced power—20 percent more. The additional 5 W overhead of the boom rotors brings the total Y4 induced power to 50.3 W, for a 15 percent net improvement.

Figure 7:
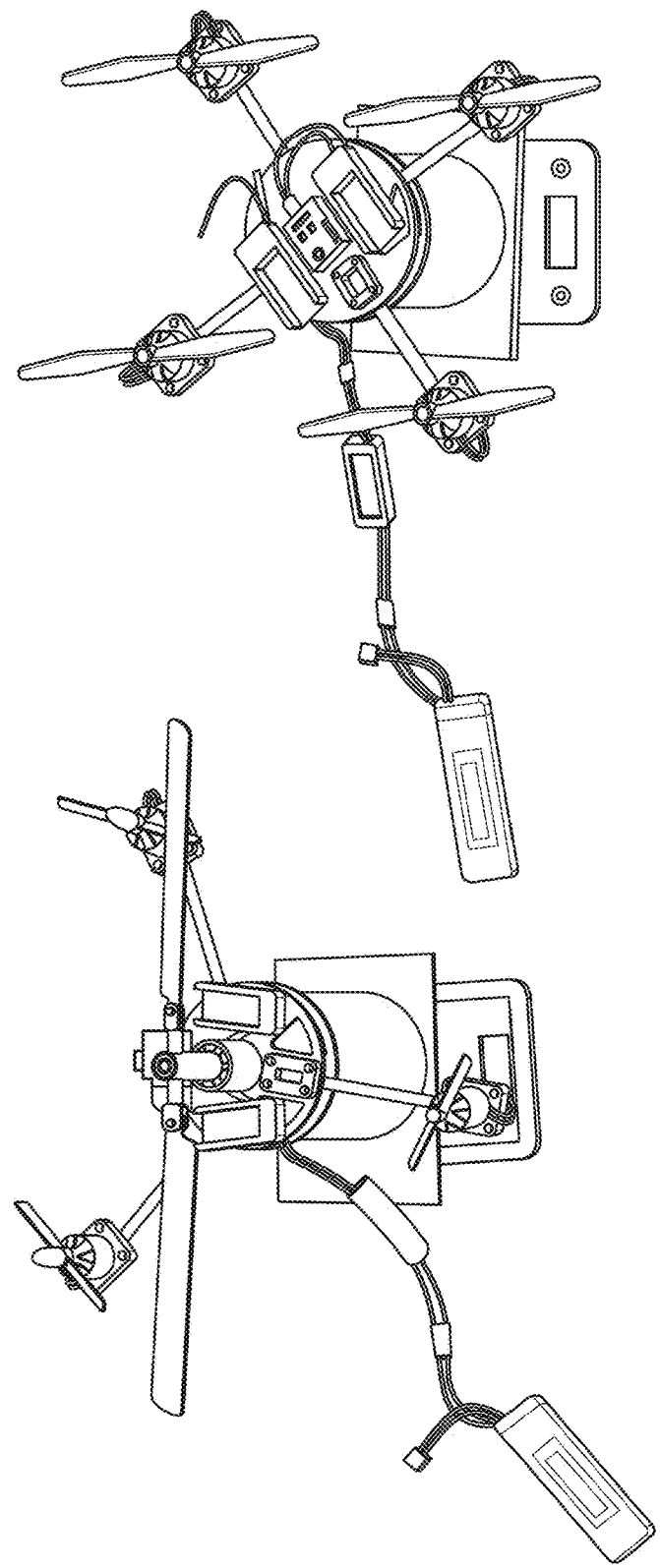
FIG. 7 illustrates a rotor characterisation thrust test configuration.
Figure 8:
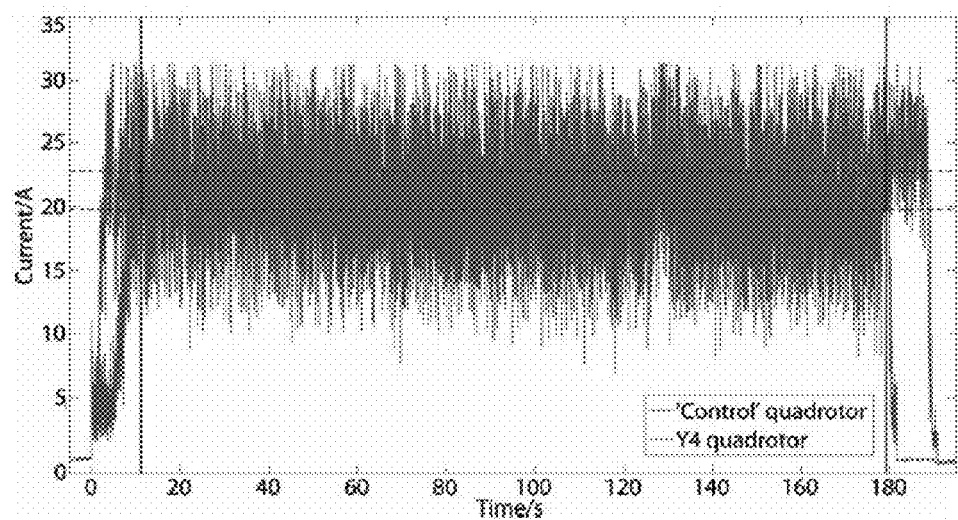
FIG. 8 illustrates the current draw of a standard and triangular quadrotor in flight.

To compare the power performance of the aircraft under actual hover conditions, two instrumented test flights were carried out. The aircraft used an Attopilot current and voltage sensor calibrated to 45 A to record battery condition and instantaneous current draw (see FIGS. 7 and 8). Each aircraft was autonomously stabilised and flown at a constant height out of ground effect for 180 seconds. To avoid start-up and shutdown transients, current data points from t=11 s and t=168 s (157 seconds duration) were averaged to find the constant current requirement. Starting at t=130 s, the Y4 underwent an aerodynamic transient due to wind, which resulted in slightly higher current draw until t=135 s. Table III lists the electrical characteristics and performance during hover. Average current draw was 19.75 A for the Y4, and 22.77 A for the standard quadrotor, with total craft power of 207.4 W and 236.5 W, respectively—15.29 percent more. As the two aircraft are powered by identical batteries of given Amp-hour capacity, this translates into a 15 percent increase in flight time.

TABLE I

QUADROTOR TEST-BED WEIGHT BUDGETS.

| Description | Mass/g | Qty | Total/g |
|---|---|---|---|
| 'Control' Quadrotor | | | |
| Delrin centre frame | 21 | 2 | 42 |
| Delrin motor mount | 5 | 4 | 20 |
| Chassis arm | 12 | 4 | 48 |
| Arm root mounts | 19 | 4 | 76 |
| Master Airscrew 7" × 4" propeller | 12 | 4 | 48 |
| RCTimer BC3530-IO 1400 KV motor | 74 | 4 | 296 |
| 18 A Turnigy speed controller | 19 | 4 | 76 |
| Afroflight Naze flight controller | 25 | 1 | 25 |
| Radio receiver | 18 | 1 | 18 |
| 3 S 1000 mAh 30c lipo battery | 84 | 2 | 168 |
| Mounting hardware | 50 | 1 | 50 |
| 18 AWG silicone wire (metre) | 31 | 2.4 | 74 |
| TOTAL | | | 941 |
| Y4 Quadrotor | | | |
| Delrin centre frame | 21 | 2 | 42 |
| Delrin motor mount | 5 | 3 | 20 |
| Chassis arm | 12 | 3 | 48 |
| Arm root mounts | 19 | 3 | 76 |
| 250-series rotor blade | 20 | 2 | 40 |
| 250-series main rotor head | 50 | 1 | 50 |
| 4" × 2.5" mini propeller | 12 | 3 | 36 |
| Tiger Motor MT2826-10 380 KV motor | 187 | 1 | 187 |
| RCTimer A2208 2600 KV motor | 38 | 3 | 114 |
| 40 A T-Motor speed controller | 35 | 1 | 35 |
| 12 A Turnigy speed controller | 10 | 3 | 30 |
| Afroflight Naze flight controller | 25 | 1 | 25 |
| Radio receiver | 18 | 1 | 18 |
| 3 S 1000 mAh 30c lipo battery | 84 | 2 | 168 |
| Mounting hardware | 50 | 1 | 50 |
| 18 AWG silicone wire (metre) | 31 | 1.8 | 56 |
| TOTAL | | | 953 |

TABLE II

ROTOR AERODYNAMIC PARAMETERS

| | Y4 Main Rotors | Y4 Boom Rotors | 'Control' Rotors |
|---|---|---|---|
| d/m | 0.460 | 0.101 | 0.178 |
| c/m | 0.0225 | 0.0121 | 0.0104 |
| $\omega_0$/rads$^{-1}$ | 286.5 | 1396 | 1028 |
| $v_{tip}$/ms$^{-1}$ | 65.89 | 70.50 | 91.49 |
| RE | 117000 | 67300 | 75100 |
| $C_T$ | 0.0101 | 0.0056 | 0.0094 |
| $C_Q$ | 0.002 | 0.0021 | 0.0017 |
| $P_A$/W | 45.35 | 1.68 | 14.65 |

TABLE III

HOVER TEST ELECTRICAL MOTOR PARAMETERS

| | Y4 Main Rotors | Y4 Boom Rotors | 'Control' Rotors |
|---|---|---|---|
| $i_{Avg}$/A | 15.64 | 1.37 | 5.63 |
| $V_{Avg}$/V | 10.5 | 10.5 | 10.5 |
| $\lambda$/NmA$^{-1}$ | 0.025132 | 0.003673 | 0.006819 |
| $R_e$/Ω | 0.059 | 0.044 | 0.051 |

C. Test-Bed Drive System Efficiency Breakdown

While chosen to be very similar, the drive systems used for the Y4 and 'control' quadrotor have slightly different efficiencies in their motor and rotor subsystems. The total efficiency of a drive unit, $\eta_\Sigma$, is the product of the motor's efficiency in converting electrical power into shaft power, $\eta_M$, and the rotor's aerodynamic efficiency in coverting shaft power into power induced in the air, $\eta_A$. Power and efficiency parameters of the experimental platforms' drive units in hover are given in Table IV, including electrical power, $P_E$, motor mechanical shaft power, $P_M$, induced power in the air, $P_A$, motor efficiency, rotor efficiency and total drive unit efficiency.

Comparing the power efficiency of the Y4 and quadrotor configurations requires assessing the efficiency the crafts' motor-rotor drives collectively—that is, the ratio between total electrical craft power and aerodynamic power. Much like a helicopter's tail rotor, the counter-torque rotors of the Y4 are parasitic, contributing little to the 'output' lifting power induced in the air.

The total effective efficiency of a craft's configuration is:

$$\eta_{Ecraft} = \frac{\sum P_A}{\sum P_E} \qquad (20)$$

In the case of the 'control' quadrotor, this will be equal to the efficiency of a single motor-rotor drive system. In the worst case for the Y4 (if the boom rotors were to provide no lift), this becomes:

$$\eta_{Ecraft} = \frac{P_{AMain}}{P_{EMain} + 3P_{EBoom}} \qquad (21)$$

The efficiencies of the two craft are very similar. The main motor-rotor drive unit efficiencies are closely matched—0.276 for the Y4 and 0.248 for the 'control'. The Y4 manoeuvering thruster rotors are especially low-performance, although their motor efficiency is surprisingly good. While the improved motor performance gives the Y4 a small 3 percent edge in main lift system efficiency, the overheard of the parasitic boom motors makes the 'control' slightly more efficiency overall, with craft efficiency of 0.248 vs 0.219 for the Y4.

The substantial difference in power reduction between the two craft clearly arises from the changing power demands of rotor configuration rather than efficiencies of the specific rotor-motor combinations.

D. Flight Control

Figure 9:
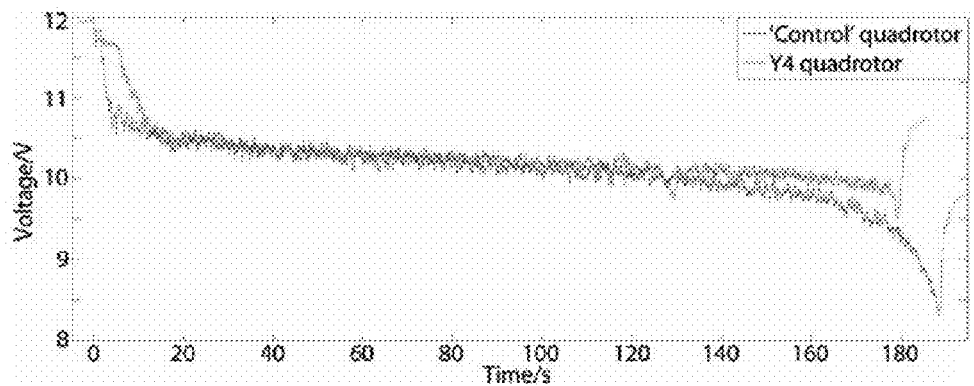
FIG. 9 illustrates the voltage of a standard and triangular quadrotor in flight.
Figure 10:
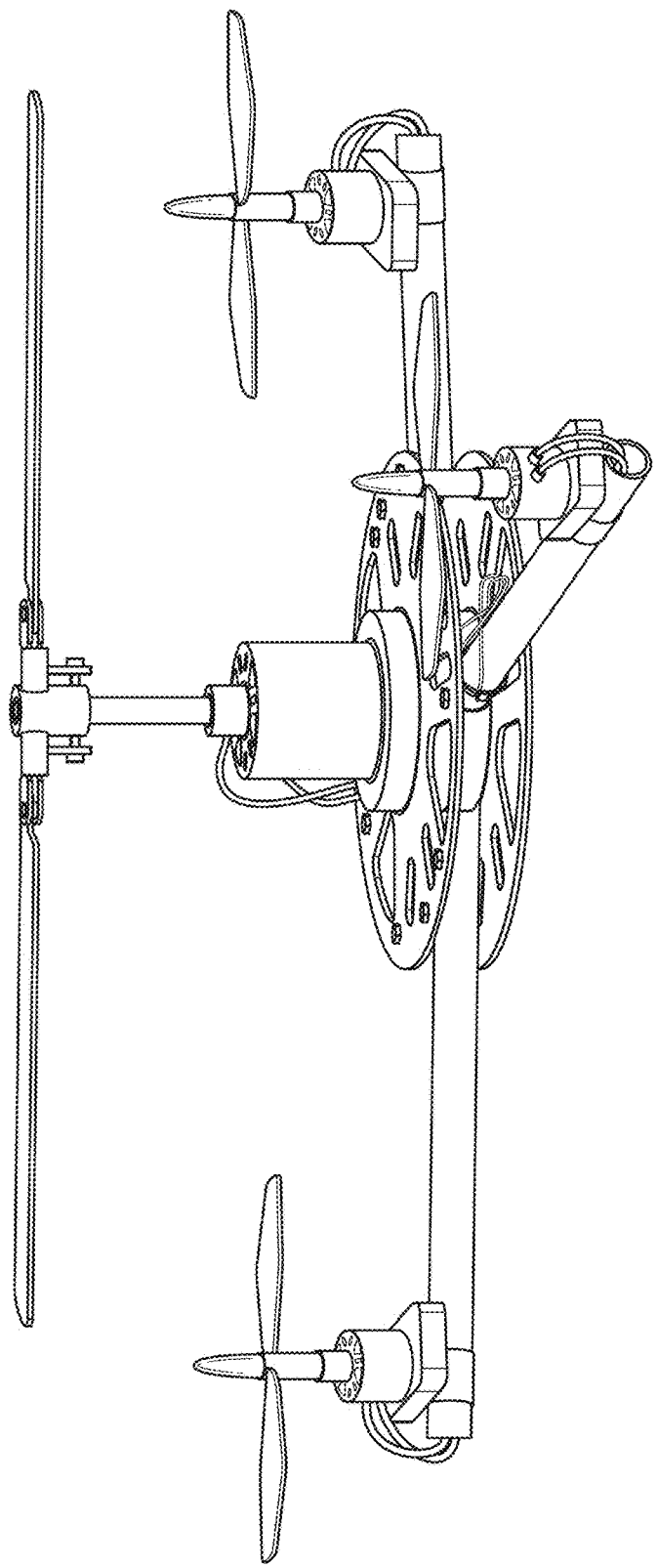
FIG. 10 illustrates a preferred embodiment of the present invention hovering outdoors.
Figure 11:
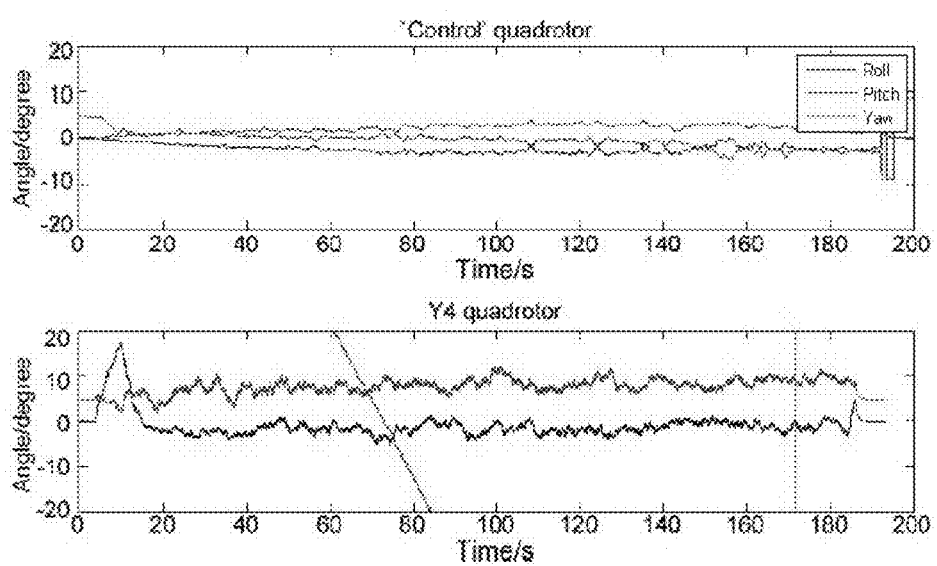
FIG. 11 illustrates roll, pitch and yaw angles of a standard and triangular quadrotor during an outdoor flight.

The Y4 has been successfully flown outdoors under autonomous control (see FIG. 9). Early results indicate that simple PID control results in a precession effect. A PID flight controller tuned on the 'control' quadrotor was directly implemented on the Y4 quadrotor. During the power characterisation flights reported in Section V-B the conventional quadrotor kept level attitude within 5 degrees of level, while the Y4 quadrotor had an 8 degree pitch bias and a constant yaw drift (see FIG. 10).

The causes for the degraded hover attitude control performance are not certain. In particular, the unbounded yaw drift was unexpected. It is thought that vibrations set up due to slight imbalances in the main rotor of the Y4 test-bed may be causing the IMU to drift. Flight tests to determine the relative control performance of the triangular quadrotor configuration are ongoing.

Non-Idealities and Future Work

Despite the 15 percent power improvement in flight performance, the analysis suggest that more gains can be realised. Non-idealities identified include features particular to the development test-bed, and unmodeled aspects of the aeromechanics. Reducing these effects will allow a better comparison to be drawn between the two configurations, and also lead to better Y4 efficiency:

Foremost, the Y4 uses a smaller main rotor footprint than the 'control'. This can be fixed by fabricating longer rotor blades that precisely match the standard quadrotor.

The stock boom rotors and 250-series rotor assembly of the Y4 can be replaced with custom rotors correctly optimised for their flow regimes, such as hyperbolic twist and chord, to maximise lift efficiency and reduce parasitic drag.

Tests must be undertaken to measure and compare the relative attitude control performance of the two test-beds, and the response bandwidth of the Y4 given its main rotor gyroscopics.

While testing is ongoing, some factors previously reported as potential causes of inefficiency and stabilisation error—specifically rotor vibration effecting the IMU, boom rotor inflow vortex ingestion, and the influence of differing rotor efficiency (see Sec III-D)—have been found to have minimal effect.

We have proposed a configuration of a four-rotor aerial robot—a quadrotor—that is substantially different from the standard quadrotor configuration. This approach employs a triangular configuration of manoeuvering rotors with a single large lifting rotor at the centre. It has been shown analytically that this the large central rotor of the triangular quadrotor configuration offers up to 20 percent power improvement over the smaller rotors of a standard quadrotor with the same footprint diameter (comparable to the benchmark power efficiency of a conventional helicopter). The smaller manoeuvering rotors of the Y4 also have the potential to provide faster response times and higher control bandwidth at the expense of stronger gyroscopics of the main rotor.

Using a matched-pair of standard and Y4 quadrotor test-beds, we found that the Y4 could deliver a 15 percent power improvement in autonomous hover power tests, even with a slight disadvantage in main rotor size and without aerodynamic rotor optimisation. The triangular quadrotor was able to be stabilised using simple PID flight control, but with degraded attitude tracking performance and unbounded yaw drift. Future work will examine the control issues with the current Y4 test-bed and attempt to resolve non-idealities in the design and this is expected to lead to further gains over the conventional quadrotor configuration.

It should be noted that reference has been made to each rotor being coupled using a respective drive shaft. However drive shafts are also commonly referred to as masts and any reference to a drive shaft may also be construed as a reference to a mast.

Many modifications will be apparent to those skilled in the art without departing from the scope of the present invention.

The invention claimed is:

1. A rotorcraft having a body and a propulsion system wherein the propulsion system includes a main thrust rotor and multiple control rotors, wherein the main thrust rotor is coupled to the body, whereby the main thrust rotor is driven by a main thrust drive shaft having an axis of rotation maintained in a fixed orientation to the body of the rotorcraft and wherein the multiple control rotors control roll, pitch and yaw of the rotorcraft and are driven by respective control drive shafts that are each maintained in respective fixed orientations that are offset to and canted relative to the axis of rotation of the main thrust drive shaft, such that each of the control rotors are arranged to generate a component of vertical thrust to produce a manoeuvering moment for the rotorcraft.

2. The rotorcraft of claim 1, wherein the roll, pitch and yaw of the rotorcraft are controlled by varying one or more of blade pitch or speed of the control rotors.

3. The rotorcraft of claim 1, wherein the main thrust rotor has collective blade pitch control.

4. The rotorcraft of claim 1, further including a flapping hinge associated with the main thrust rotor to assist with gyroscopic precession correction.

5. The rotorcraft of claim 4, wherein the flapping hinge is a mechanical or flexural flapping hinge included in the main thrust rotor.

6. The rotorcraft of claim 1 wherein the control rotors are in an array disposed about the axis of rotation of the main thrust drive shaft.

7. The rotorcraft of claim 6 wherein the rotorcraft includes three control rotors.

8. The rotorcraft of claim 7 wherein the control rotors are arranged about the axis of rotation of the main thrust drive shaft at intervals of 120°.

9. The rotorcraft of claim 6 wherein the control rotors are arranged asymmetrically about the axis of rotation of the main thrust drive shaft.

10. The rotorcraft of claim 1 wherein the control rotors are radially disposed from the axis of rotation of the main thrust drive shaft and are positioned above or below and within the swept area of the main thrust rotor.

11. The rotorcraft of claim 1 wherein the control rotors are positioned in the downwash of the main thrust rotor.

12. The rotorcraft of claim 1 wherein the control rotors have fixed pitch blades.

13. The rotorcraft of claim 1 wherein the thrust of the main thrust rotor is parallel to the axis of rotation of the main thrust drive shaft.

14. The rotorcraft of claim 1, having a centre of mass and wherein the main thrust rotor is positioned below the centre of mass of the rotorcraft.

15. The rotorcraft of claim 1 wherein a controller is used to correct for rotor gyroscopic precession torques using the control rotors.

16. The rotorcraft of claim 15 wherein the controller uses modified linear PID control with gyroscopic correction to correct for rotor gyroscopic precession torques.

17. The rotorcraft of claim 1 wherein a feedback control system is used to stabilise the rotorcraft in flight.

18. A method of controlling the rotorcraft of claim 1, including manoeuvring the rotorcraft by varying one or more of the pitch or speed of one or more of the control rotors and/or a collective blade pitch of the main thrust rotor.

19. The rotorcraft of claim 1, wherein the rotorcraft is free-flying or untethered.

20. A rotorcraft with a fixed-pitch main rotor that generates lift and torque and multiple control rotors to provide counter-torque and attitude control, wherein the control rotors are canted relative to the main rotor and are arranged in a fixed orientation to generate a component of vertical thrust to produce a manoeuvering moment for the rotorcraft.

21. The rotorcraft of claim 20, further including a drive system that allows independent speed control of each of the control rotors and/or the main rotor to allow for manoeuvring.

22. The rotorcraft of claim 20, wherein the control rotors are arranged to spin in the same direction.

23. The rotorcraft of claim 20, wherein the control rotors are smaller than the main rotor and have fixed pitch blades.

24. The rotorcraft of claim 20, wherein three control rotors are arrayed about the rotorcraft.

25. The rotorcraft of claim 24, wherein the control rotors are arranged about the centre of the rotorcraft at intervals of 120°.

26. The rotorcraft of claim 24, wherein the control rotors are arranged asymmetrically about the centre of the rotorcraft.

27. The rotorcraft of claim 24, wherein the control rotors are mounted on booms that project from a main body of the rotorcraft.

28. The rotorcraft of claim 20, wherein the main rotor defines a rotor disc area footprint that covers the control rotors.

29. The rotorcraft of claim 20, wherein the control rotors are positioned downstream of the main rotor.

30. The rotorcraft of claim 20, wherein the rotorcraft is in the form of an unmanned aerial vehicle.

31. The rotorcraft of claim 20, wherein a controller is used to correct for rotor gyroscopic precession torques using the control rotors.

32. The rotorcraft of claim 31, wherein the controller uses modified linear PID control with gyroscopic correction to correct for rotor gyroscopic precession torques.

33. The rotorcraft of claim 20, wherein a mechanical or flexural flapping hinge is included in a rotor head such that the primary plane may tilt with respect to a main body of the rotorcraft.

34. The rotorcraft of claim 20, wherein a feedback control system is used to stabilise the rotorcraft in flight.

35. The rotorcraft of claim 20, wherein the main rotor is located below a main body of the rotorcraft.

36. A method of controlling the rotorcraft of claim 20, including maneuvering the rotorcraft by adjusting the relative speed of one or more of the control rotors.

37. The method of claim 36, wherein the adjustment of the relative speed of one or more of the control rotors causes the rotorcraft to pitch, roll or yaw.

38. A rotorcraft including a main rotor that rotates on a primary plane and a plurality of control rotors, wherein each control rotor rotates on a separate control plane that is at an angle relative to the primary plane, wherein the angles of the control planes relative to the primary plane are fixed and the control planes are arranged to generate a component of vertical thrust to produce a manoeuvering moment for the rotorcraft.

39. The rotorcraft of claim 38, wherein the main rotor and control rotors have fixed pitch blades.

40. The rotorcraft of claim 38, wherein the control rotors rotate in the same direction.

41. The rotorcraft of claim 38, wherein a centre of mass of the rotorcraft is located between the primary plane and the control planes.

* * * * *